United States Patent
Chan et al.

Patent Number: 6,061,051
Date of Patent: May 9, 2000

[54] COMMAND SET FOR TOUCHPAD PEN-INPUT MOUSE

[75] Inventors: Chow Fong Chan; Maisy Mun Lan Ng; Eng Yue Ong; Xia Geng; Swee Hock Alvin Lim, all of Singapore, Singapore

[73] Assignee: Tritech Microelectronics, Singapore, Singapore

[21] Appl. No.: 08/785,726

[22] Filed: Jan. 17, 1997

[51] Int. Cl.[7] .................................................. G09G 5/00
[52] U.S. Cl. ............................................ 345/173; 345/174
[58] Field of Search ........................................ 345/156, 157, 345/173, 174, 175; 178/18, 19

[56] References Cited

U.S. PATENT DOCUMENTS

| | | | |
|---|---|---|---|
| 4,954,817 | 9/1990 | Levine | 345/179 |
| 5,701,141 | 12/1997 | Schmenk et al. | 345/173 |

Primary Examiner—Matthew Luu
Attorney, Agent, or Firm—George O. Saile; Stephen B. Ackerman; Billy J. Knowles

[57] ABSTRACT

A method and system for issuing pen-input commands from a computer system to a controller for a touchpad to initialize the controller to the desired operating mode for the touchpad. The touchpad may emulate the function of a mouse pointing device or provide absolute coordinates of a pointed object such as human finger, a stylus, or a pen upon the touchpad. The pen-input commands will set the autocursor mode and boundaries for the edgezone and the deadzone upon the touchpad, the times for the presence detect signal to create the stroke signal, the threshold of movement of the pointed object upon the touchpad necessary to send the mouse protocols to the computer system, the mode of the pen-input mouse controller is to operate, whether the pen-input mouse controller is to send the mouse protocol or the pen-input computer interface protocol to the computer system, the averaging algorithm to used by the absolute coordinate calculator, the minimum pressure required to activate the touchpad, the parameters for the autocursor mode operation, and the time parameters for the autopower save circuit.

14 Claims, 3 Drawing Sheets

COMMAND SET FOR TOUCHPAD PEN-INPUT MOUSE

BACKGROUND OF THE INVENTION

1. Field of the Invention

The present invention relates to computer system input devices such as a digitizers referred to as touchpads and more particularly to commands and protocols necessary to communicate signals acquired from such input devices to the computer system to control the movement of a cursor upon a display screen or for the computer system to communicate initial operating parameters to the input devices.

2. Description of Related Art

Touchpads are small digitizer based devices that are pen input devices to allow a person to write or draw upon the surface of the touchpad and have the signals and codes from a controller to be interpreted by a computer system. The touchpad digitizers may be of three types, capacitive, resistive and electromagnetic.

Referring to FIG. 1, the surface 12 of the touchpad becomes a "writing surface" for capturing the position of an pointed object 10 such as a finger, pen or stylus upon the touchpad. The touchpad signals are analog signals that will be captured by a touchpad interface circuit 28 and translated to digital codes that will be transferred to a computer system 32 on an interface 30. The interface 30 may be an industry standard serial interface, an industry standard parallel interface, or a custom interface requiring special adapter circuitry within the computer system 32 to accept the digital codes from the touchpad interface 28.

An example of a resistive touchpad is shown in FIG. 1. The resistive touchpad is made up of multiple layers of resistive films and protective layers. The protective hard coating 12 is the surface onto which the pointed object 10 is pressed upon during the writing and drawing. A first layer of resistive film 14 is attached to the protective hard coating 12 on the surface opposite the writing surface. This first layer of resistive film forms the Y-plane of the touchpad. Attached to the surface of the Y-plane resistive film 14 opposite the surface attached to the hard protective coating 12 is a second resistive film 16. This second resistive film 16 forms the X-plane of the touchpad. Finally attached to the side of the X-plane resistive film 16 is a supporting back layer 18. This back layer provides protection and mechanical support for the for the X-plane and Y-plane resistive films 14 and 16.

The touchpad interface 28 is connected through the touchpad interface lines 20, 22, 24, and 26. Each line will provide a stimulus such as a current or voltage to the periphery of the X-plane resistive film 16 and the Y-plane resistive film 14. As the pointed object 10 is pressed on the touchpad surface 12, the Y-plane resistive film 12 will deform and touch the X-plane resistive film 14. The X-plane resistive film can not deform because it is supported by the supporting back layer 18. This causes the Y-plane resistive film 14 and the X-plane resistive film 16 to come into contact with each other. This will cause a response in the form a change in voltage or current depending upon whether the stimulus from the touchpad interface 28 is a constant voltage or a constant current. If the stimulus from the touchpad interface 28 is a constant voltage the currents through the touchpad interface lines 20, 22, 24, and 26 will be modified according to the position of the pointed object 10 on the touchpad surface 12. However, if the stimulus from the touchpad interface is a constant current the voltages between the touchpad interface lines 20, 22, 24, and 26 will be modified according to the position of the pointed object 10 on the touchpad surface 12.

The touchpad interface 28 will have a set of analog to digital converters that will sense the change in the analog responses from the touchpad interface lines 20, 22, 24, and 26 and convert them to digital codes indicating the absolute position of the pointed object 10 upon the touchpad surface 12. The digital codes may be transmitted directly to the computer system across the interface 30 and translated to absolute coordinates within the computer system or the touchpad interface 28 may determine the absolute coordinates and transmit them directly to the computer system 32. For the computer system 32 to use the absolute coordinates generated by the touchpad interface 28 to control the movement of the cursor 36 upon the display screen 34, these absolute coordinates must be modified to codes that define the relative motion of the cursor 36. The relative motion will be the speed and direction of the cursor 36 as it is moved across the display screen 34. The modification from absolute coordinates to relative motion information must be done with in a cursor control program resident within the computer system 32.

A mouse is a point and click device that can be attached to a computer system to control the movement of a cursor on a display screen of the computer system. As described in "A Hardware and Software Resolution For A Pointing Device" AN569, in the Embedded Control Handbook, Microchip Technology Inc., 1994, "a standard motion translator for mice is the use of two slotted wheels, one each for horizontal and vertical direction. Also, there are two optical receivers per slotted wheel. As the slotted wheel turns, infrared beams of light are alternately transmitted and blocked, thereby sending a series of ones and zeros to optical transistor receivers. The two optical receivers are offset from each other such that the resulting signals are 90° degrees out of phase. The phase difference results in two distinctly separate signals. The (mouse) controller interprets what direction the mouse is moving along either axis by the order is receives those two signals." The mouse controller counts the number of pulses per unit time and since the spacing of the slots and bars is uniform and equal in number, the relative velocity along each axis is calculated.

The direction and relative velocity are coded to set of mouse motion digital codes. These codes may be of several formats. Two representative mouse motion digital codes are shown in Table 1. The first is for the Microsoft Mouse from Microsoft Corp. and the second is for the PS/2 Mouse from International Business Machines (IBM).

TABLE 1

Microsoft Mouse Format

| Byte | Bit 7 | Bit 6 | Bit 5 | Bit 4 | Bit 3 | Bit 2 | Bit 1 | Bit 0 |
|---|---|---|---|---|---|---|---|---|
| 1 | not used | 1 | L | R | W | V6 | H7 | H6 |
| 2 | not used | 0 | H5 | H4 | H3 | H2 | H1 | H0 |
| 3 | not used | 0 | V5 | V4 | V3 | V2 | V1 | V0 |

IBM PS/2 MOUSE FORMAT

| Byte | Bit 7 | Bit 6 | Bit 5 | Bit 4 | Bit 3 | Bit 2 | Bit 1 | Bit 0 |
|---|---|---|---|---|---|---|---|---|
| 1 | Y OVR FLOW | X OVR FLOW | Y SIGN | X SIGN | RES | RES | SB | PB |
| 2 | DELTA X MOTION ||||||||
| 3 | DELTA Y MOTION ||||||||

For the Microsoft Mouse, Bit 5 of Byte 1 indicates if the left button of the mouse is depressed. Bit 4 of Byte 1 indicates if the right button of the mouse is depressed. Bits 3 and 2 of Byte 1 and bits 0 through 5 of the Byte 3 indicate the relative motion of the mouse in the vertical direction. Bits 1 and 0 of the Byte 1 and bits 0 through 5 of Byte 2 indicate the relative motion of the mouse in the horizontal direction. These codes form signed binary numbers. If the vertical signed binary number V0:V7 is positive the mouse is moving downward and if the vertical signed binary number V0:V7 is negative the mouse is moving upward. If the signed binary number H0:H7 is positive the mouse is moving toward the right and if the signed binary number H0:H7 is negative, the mouse if moving toward the left. The magnitudes of the horizontal H0:H7 and the vertical V0:V7 signed binary numbers indicate the relative velocity of the mouse movement.

For the IBM PS/2 mouse, Bit 0 of the first Byte indicates the Primary (in the Microsoft Mouse Left Mouse Button) Mouse button has been pressed. Bit 1 of the first Byte indicates the Secondary (in the Microsoft Mouse Right Mouse Button) Mouse button has been pressed. Bits 2 and 3 of the first Byte are reserved and not used. Bit 4 of the first Byte is an X direction sign bit, where if it is a 1, the X data (or horizontal) is negative and Bit 5 of the first Byte is a Y direction sign bit, where if it is a 1 the Y data (vertical) is negative. Bit 6 and Bit 7 of the first Byte are overflow bits for the X and Y data respectively, indicating that the mouse is traveling faster than the circuitry can reliably calculate its velocity. Byte 2 indicates the total movement (Delta X)of the mouse in the X direction since the last report of movement. Byte 3 indicates the total movement (Delta Y)of the mouse in the Y direction since the last report of movement.

TABLE 2

| COMMAND | CODE, DATA |
|---|---|
| Reset | FFh |
| Resend | FEh |
| Set Default | F6h |
| Disable Reporting | F5h |
| Enable Reporting | F4h |
| Set Report Rate | F3h, XXh |
| Read Device Type | F2h |
| Set Remote Mode | F0h |
| Set Wrap Mode | EEh |
| Reset Wrap Mode | ECh |
| Read Data | EBh |
| Set Stream Mode | EAh |
| Status Request | E9h |
| Set Resolution | E8h, XXh |
| Set Scaling | E7h |
| Reset Scaling | E6h |

For a mouse controller designed to the IBM PS/2 mouse protocol, a set of commands transferred from the computer system will establish the operating characteristics of the mouse controller. Table 2 shows the mode commands for an IBM PS/2 controller. As described in the Product Specification for the MT41110, Microchip Data Book, Microchip Technology Corporation, 1995, the IBM PS/2 mode commands are explained as follows:

RESET
This command initiates a reset sequence in the mouse controller. All internal registers and communication parameters are cleared. The status registers are set to their default condition. The mouse controller responds to the computer system with a Code of Mh followed by a 00h to inform the computer system that the mouse is a standard mouse.

RESEND
When the mouse controller receives an invalid command, the mouse controller will transmit the RESEND command to the computer system. The mouse controller will ignore any invalid command and continue to operate at the present mode.

The computer system may send a RESEND command to the mouse controller. The mouse controller will retransmit the last data transmitted to the computer system.

SET DEFAULT
All the mouse controller parameters will be reset to those that existed at the power-up state.

DISABLE REPORTING
The mouse controller is prevented from transmitting data while the controller is in STREAM MODE. The mouse controller will respond to commands from the computer system that do not require a response. If the computer system needs to have a response from the mouse controller, the STREAM MODE must be disabled before the computer system sends a command that requires a response.

ENABLE REPORTING
The mouse controller will be able to send data other than the relative motion codes during the stream mode. This command has no effect during the REMOTE MODE.

SET REPORT RATE
The report rate status register is updated to the new data contained in the second byte of the command. This establishes the rate at which the mouse controller send the relative motion digital codes to the computer system.

READ DEVICE TYPE
The mouse controller responds to this command with a digital code indicating the type of device(00h) is being used as a pointing device.

SET REMOTE MODE
In the remote mode, the relative motion digital codes are transmitted to the computer system only when the mouse controller receives the READ DATA command.

SET WRAP MODE
In the wrap mode the mouse controller will echo each command that is transmitted to the mouse controller back the computer system. RESET and RESET WRAP MODE will cancel the wrap mode and the mouse controller will not longer echo each command from the computer system. The wrap mode can be set in each of the reporting modes, REMOTE MODE or STREAM MODE.

RESET WRAP MODE
This command will instruct the mouse controller to reset the wrap mode and cease the echoing of the commands back to the computer system.

READ DATA
The mouse controller will transmit the relative motion digital codes to the computer system in response to this command. This command can be issued in REMOTE MODE or STREAM MODE and the mouse controller will transmit the data even if there has been no button pushed or any motion from the mouse since the last report.

SET STREAM MODE
The mouse controller will send the relative motion digital codes each time they are compiled.

STATUS REQUEST
The mouse controller will send a three byte status report at the receipt of this command from the computer system. The status bytes are defined as follows:

| Byte 1 Bit | Description |
| --- | --- |
| 0 | 1 = Secondary (Right) Button Depressed |
| 1 | Reserved |
| 2 | 1 = Primary (Left) Button Depressed |
| 3 | Reserved |
| 4 | 1 = 2:1 Scaling |
| 5 | 1 = Enabled |
| 6 | 1 = Remote Mode |
| 7 | Reserved |
| Byte 2 | Current Resolution |
| Byte 3 | Current Sample Rate |

SET RESOLUTION

The mouse controller will assume one of four resolutions dependent on the second byte of the command. The physical resolution of the mouse, which is fixed and cannot be modified, is divided by divisor as indicated in the following:

| Second byte | Description |
| --- | --- |
| 0 | divide by 8 |
| 1 | divide by 4 |
| 2 | divide by 2 |
| 3 | divide by 1 |

SET SCALING

Scaling is used to provide a coarse/fine tracking response at the end of a sample interval in stream mode, the current X and Y data values are converted to new values. The sign bits are not involved in this conversion.

The relation between the input counts and the output counts is as follows:

| Input | Output |
| --- | --- |
| 0 | 0 |
| 1 | 1 |
| 2 | 1 |
| 3 | 3 |
| 4 | 6 |
| 5 | 9 |
| N | 2.0 × N |

2:1 scaling is only performed in stream mode. In response to "Read Data" command the MOUSE will transmit the current value before conversion.

RESET SCALING

Upon receipt of this command the mouse controller will reset the scaling factor to 1:1 from the scaling factor of the SET SCALING FACTOR command.

Referring back to FIG. 1, if the touchpad is to emulate the mouse movements, when the cursor 36 is moved across the display screen 34 for a relatively long distance, the pointed object 10 must be repeatedly lifted and placed back on the touchpad surface 12 giving a "rowing" motion to get the cursor 36 to move the long distance. In traditional mouse operations, if the cursor 36 is to drag an object being displayed upon the display screen 34 a button on the mouse is depressed while the mouse is moved. The button can be held depressed while the mouse is moved in the rowing motion to drag the object across the display screen 34. This is difficult to accomplish on the touchpad. If the pointed object 10 is lifted from the touchpad, the touchpad interface 28 will not be able to communicate the "rowing" motion to indicate that the cursor 36 is to travel a long distance. Also, the touchpad interface 28 will not be able to communicate that there is an intention for the cursor 36 to drag the object on the display screen 34. Additional buttons must be added to the touchpad or special areas within the surface of the touchpad surface 12 in order for the touchpad interface 28 to communicate the desire for the cursor 36 to be moved long distances across the display screen 34 or that the cursor 36 is to drag objects upon the display screen 34.

U.S. Pat. No. 5,327,161 (Logan, et al.) use a method to emulate mouse input devices using a program resident within a computer system. A touchpad input device has a controller that generates a digital code that contains the absolute position of a pen or finger on the mouse pad. This requires a special interface that is unique to the touchpad circuitry. Additionally, this patent describes a method for the continuation of cursor movement when a pointed object is touching the touchpad and has been moved on the touchpad to a special border area. The pointed object must be stopped within the border for the continuous motion to be engaged. The direction of the scrolling may be made as a modification of the original direction and velocity of the pen prior to the transiting and stopping within the border area of the touchpad. This modification will be made as a change in the velocity of the movement of the cursor along an axis parallel to the edge of the touchpad adjacent to the border area where the pointed object is resting.

U.S. Pat. No. 5,376,946 (Mikan) describes a circuit using an EPROM to convert signals from a touch screen adhered to a computer display screen to digital codes of the industry standard computer input mouse protocols.

U.S. Pat. No. 5,543,590 (Gillespie, et al.) describes a capacitive sensor system that can detect the location of a finger or stylus on a sensor matrix. The location is determined and translated as electrical signals for use in other circuitry such as a computer system to control a cursor upon a display screen. Further this patent discusses an "edge motion" detection feature that will allow a finger or stylus within a "outer zone" of the sensor matrix to move the cursor to move across a display screen for long distances and avoid the "rowing" motion.

U.S. Pat. No. 5,543,591 (Gillespie, et al.) discloses methods for recognizing tapping, pushing, hopping and zigzagging gestures upon a conductive sensor pad that can be interpreted into cursor control motions such as clicking, double clicking, and click and drag use with computer mouse devices. Further this patent also describes the "edge motion" feature as described in U.S. Pat. No. 5,543,590 (Gillespie, et al.).

SUMMARY OF THE INVENTION

An object of this invention is to a provide touchpad—computer system communication method that will permit a computer system to command a touchpad controller to emulate the functions of a mouse pointing device. Another object of this invention is to allow a pointed object to control the movements of a cursor upon a display screen of the computer system in a manner that is the same as a mouse pointing device. Still another object of this invention is to allow the computer system to transmit the necessary parameters to configure the touchpad controller to create a mouse code protocol or a pen-input computer interface protocol and transmit either the mouse code protocol or the pen-input protocol as selected to the computer system.

To accomplish these and other objects, the touchpad—computer system communication method comprises the sending as appropriate each of the following commands:

a) a set Autocursor Mode command to activate an Autocursor Mode, deactivate the Autocursor Mode, to set the Autocursor Mode to move the cursor only and to set the autocursor mode to move the cursor and an object upon the display screen attached to the cursor;

b) a set edgezone boundary command to establish a first boundary between a workzone and an edgezone upon the touchpad;

c) a set first minimum edge movement threshold command to set a value of the absolute digital codes at which the autocursor mode is be conditionally activated, wherein the set first minimum edge movement threshold command contains the value of a minimum distance between a last sampling of the absolute digital codes prior to the pointed object crossing the boundary of the edgezone and a first sampling of the absolute digital codes subsequent to crossing the boundary of the edgezone to conditionally activate the autocursor mode;

d) a set second minimum edge movement threshold command to set a value of the absolute digital codes at which the autocursor mode is be unconditionally activated, wherein the set second minimum edge movement threshold command contains the value of the minimum distance from the first sampling of the absolute digital codes subsequent to crossing the boundary of the edgezone to a second sampling of the absolute digital codes subsequent to crossing the boundary of the edgezone to unconditionally activate the autocursor mode e) a set deadzone boundary command to establish the boundary between the edgezone and the deadzone, wherein this command contains the value of the absolute coordinates for this boundary;

f) a set autopower save time command to establish the amount of time that the pointed object must be not in contact for the autopower save circuitry to create the autopower save signal to power down the pen-input mouse controller, wherein this command contains a code that indicates the amount of time that the pen must not be in contact with the touchpad;

g) a set first finger on time command to establish the amount of time that the pointed object must on the touchpad surface to establish the stroke signal that contains the single click, double click, move, press and drag mouse operations;

h) a set second finger off time command to establish the amount of time that the pointed object must off the touchpad surface to establish the stroke signal that contains the single click, double click, move, press, and drag mouse operations;

i) a set third finger on time command to establish the amount of time that the pointed object must on the touchpad surface to establish the stroke signal that contains the double click and drag mouse operations;

j) a set fourth finger off time command to establish the amount of time that the pointed object must off the touchpad surface to establish the stroke signal that contains the double click;

k) a set minimum mouse movement threshold to set the minimum increment in the value of the relative motion digital codes that will be reported to the computer system l) a set pen input mode to change the operation of the pen-input mouse controller to either the pen-input mode, if selected to report the absolute relative motion digital codes to the computer system and to the mouse mode if selected to report to the relative motion digital codes to the computer system;

m) a set three dimensional mode to set the pen-input mouse controller to report either the relative motion digital codes if mouse mode selected and the absolute coordinate digital codes and the pressure digital codes if pen-input mode selected, wherein the pressure digital codes will contain the vertical information and may be used to sense the distance the pointed object is from the surface of the touchpad for a capacitive touchpad or the pressure the pointed object upon the touchpad for a resistive touchpad;

n) a set mouse mode command to instruct the pen-input mouse controller to transmit the relative motion digital codes in according the selected mouse format;

o) a set average algorithm command to instruct the pen-input mouse controller an averaging algorithm of the set of averaging algorithms to use during the pen-input mode, wherein the algorithm will establish the absolute coordinate digital codes; and p) a set pressure threshold command set the minimum pressure of the pointed object upon the touchpad necessary to activate the touchpad and have the pen-input mouse controller report the mouse motion digital codes or the absolute coordinate digital codes.

DETAILED DESCRIPTION OF THE INVENTION

Figure 1:
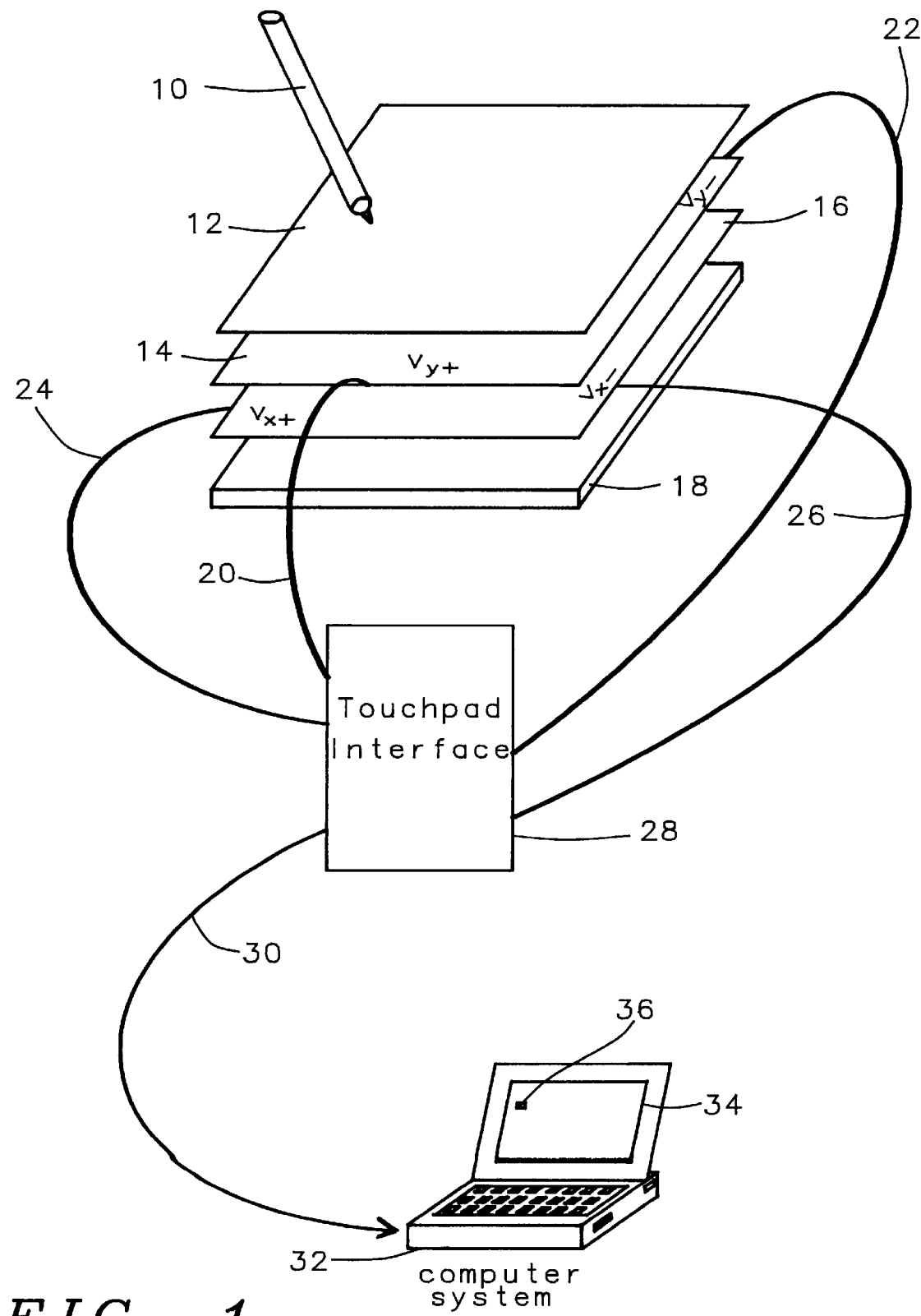
FIG. 1 is an illustration of a resistive film touchpad digitizer as a computer input device.

The touchpad interface of FIG. 1 may be a touchpad pen-input controller. The touchpad pen-input controller has a touchpad driver which will provide a constant current as a stimulus to the touchpad as shown in FIG. 1. The touchpad driver will provide a constant current source connected to the X+ line that is connected to the X-plane 16 of the touchpad and a constant current sink is connected to the X− line that is connected to the opposite side of the X-plane 16 of the touchpad. The touchpad driver will provide a second constant current source connected to the Y+ line that is connected to the Y-plane 14 of the touchpad and a second current sink that is connected to the Y− line that is connected to the Y-plane 14 on the side opposite the connection of the Y+ line. As a pointed object such as a finger, stylus, or pen is moved across the touchpad, the resistance of the resistive film as described in FIG. 1 changes causing the voltage at the current sources connected to the X+ line and Y+ line and at the current sinks connected to the X− line and Y− line to vary. The voltage variation will be proportional to the distance that the contact is from the peripheral edges of the touchpad where the X+ and Y+ lines and the X− and Y− lines are attached.

The voltages present at the connections of the current sinks connected to the X- and Y- lines are coupled to a multiplexing analog-to-digital converter. These voltages are converted at regular timing intervals to a set of location digital codes representing the amplitude of the voltages present at the connections of the current sinks connected to the X- and Y- lines that indicate the location of the pointed object pressed on the touchpad surface.

The voltages present at the connections of the current sources connected to the X+ and Y+ lines and the current sinks connected to the X- and the Y- lines are also coupled to the pressure sense circuit. The pressure sense circuit converts the voltages to an analog pressure sense signal. The pressure sense signal is proportional to the magnitude of the force of the pointed object pressing upon the touchpad.

The pressure sense signal is an input to the multiplexing analog-to-digital converter and will convert, at regular timing intervals, the pressure signal to a set of pressure digital codes that represent the magnitude of the pressure sense signal.

The signal X- is transferred to the pen detect circuit which will set the pen detect signal to a first logic state when a change in the location digital codes and the set of pressure digital codes indicate that there has been a pointed object pressed on the touchpad surface. The pen detect signal will assume a second state when the signal X- indicates that there is no object pressed on the touchpad surface.

The location digital codes also are transferred to the touchpad computer interface. The touchpad computer interface will average the location digital codes to minimize the effects of rapid variations in the location digital codes due to the fluctuations of the pointed object upon the touchpad. The averaged location digital codes are converted to a touchpad computer interface protocol that describes the absolute coordinates of the pointed object upon the touchpad. The touchpad computer interface can be configured to provide either no averaging of the location digital codes, a running average of the location digital codes, or an infinite impulse response average of the location digital codes. The running average is determined by:

$$\overline{X_i} = \frac{X_{i-n} + \ldots + X_{i-1} + X_i}{n + 1}$$

Where:
$\overline{X_i}$=the current average
$X_i$=The current location digital codes
$X_{i-n}$=The nth previous location digital codes
$X_{i-1}$=The previous location digital codes
n+1=the sample size to create the average.
The infinite impulse response average is determined by:

$$\overline{X_i} = \frac{\overline{X_{i-1}} + X_i}{2}$$

Where:
$\overline{X_i}$=the current average
$X_i$=The current location digital codes
$\overline{X_{i-1}}$=The previous average of the location digital codes The pressure digital codes are transferred to the touchpad computer interface to be merged to the touchpad interface protocol for transmission to the computer system.

The set of averaged location digital codes are transferred to the relative motion calculator. The relative motion calculator will record multiple sets of the averaged location digital codes and calculate a set of relative motion digital codes that are the speed and direction of the motion of the pointed upon the surface of the touchpad. The relative motion digital codes are calculated by recording the difference of the current absolute digital codes and the previous absolute location digital codes. If the current absolute location digital codes are the first after the pointed object has been pressed onto the touchpad, the relative motion digital codes remain at zero and the second set of absolute location digital codes are received.

Figure 2:
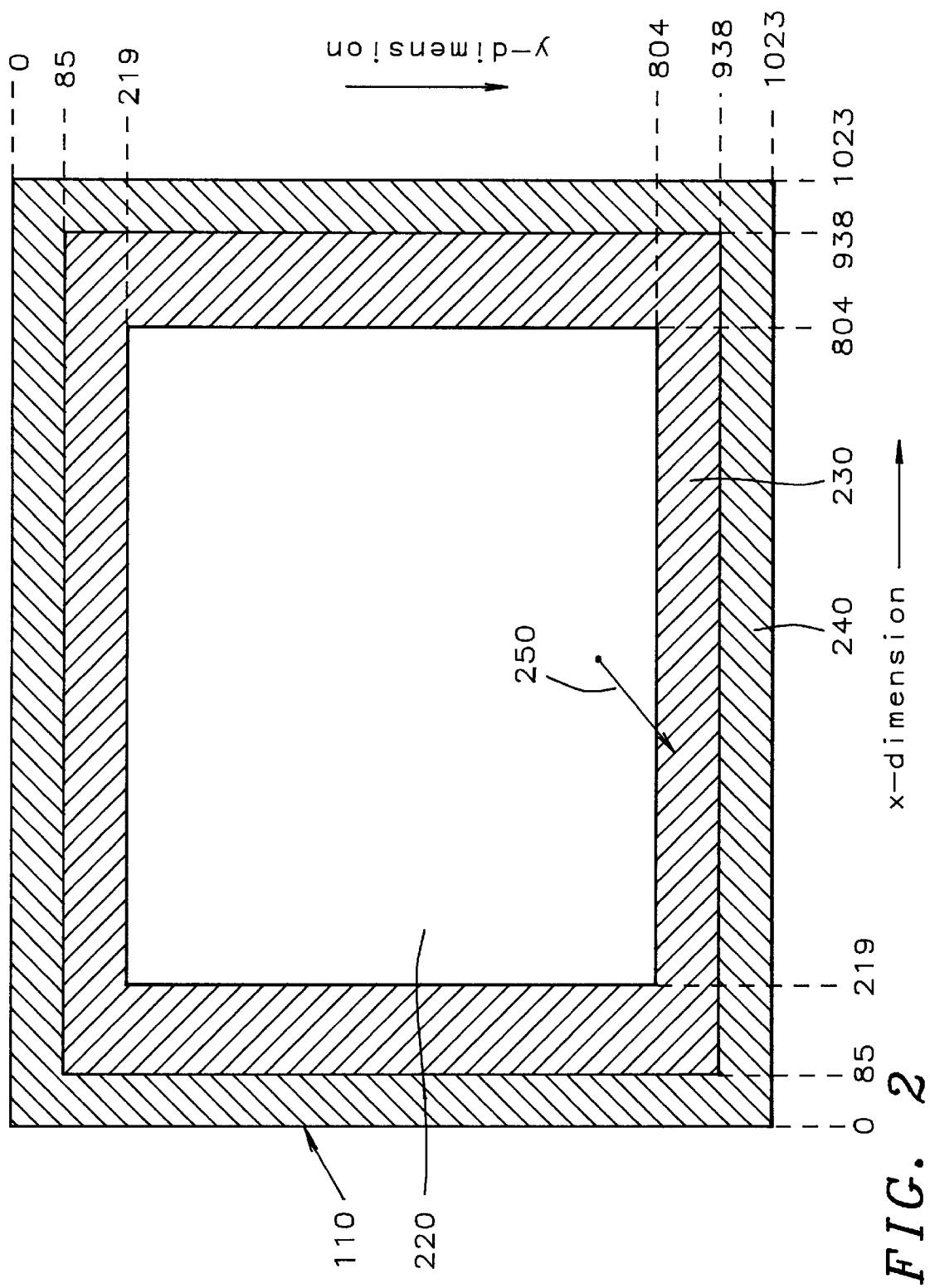
FIG. 2 is an illustration of the top surface of a touchpad showing the workzone and edgezone area for autocursor motion of this invention.

The relative motion digital codes and the averaged location digital codes are transferred to the autocursor motion controller. The autocursor controller is a selectable feature that when selected, will divide the touchpad surface into a workzone and an edgezone. As shown in FIG. 2, the workzone 220 is the central area of the touchpad 110. The edgezone 230 is the area near the periphery of the touchpad 110. If the pointed object is pressing the touchpad and transits a sufficient distance from the workzone 220 into the edgezone 230, the autocursor motion control will activate and create a set of predefined autocursor digital codes. The speed and direction as expressed by the relative motion digital codes prior to the transiting from the workzone 220 to the edgezone 230 become constrained in speed and direction. The autocursor digital codes will remain constant if the pointed object either is in the constrained direction and the constrained speed or is brought to a stop. The autocursor digital codes can be changed within the edgezone by moving the pointed object pressing upon the touchpad 110 at a free speed and direction. If the speed is to be changed but the direction is not to be changed, the pointed object should be moved at the new speed while maintaining the constrained direction. The autocursor digital codes will be modified to increment the constrained speed to a new value. If the new speed and direction is required, the pointed object moves in the free direction for an amount sufficiently large so as to indicate a definite movement and not a random motion or wiggling of the human hand moving the pointed object upon the touchpad 110. The new direction and speed is captured from the relative motion digital codes and the autocursor digital codes are created indicating the new constrained speed and constrained direction. As an example if the pointed object were following the path 250 upon the touchpad 110 and a pointed object enters the edgezone 230, the pointed object may stop movement and the autocursor digital codes would be generated as though the speed and motion were being maintained even though the pointed object may in fact have ceased movement. If a new direction or speed is desired the pointed object will move in the new direction at the new speed and the autocursor digital codes will be modified to reflect the changes and the point object again can cease motion.

The autocursor motion control will cease to generate the autocursor digital codes if the pointed object transits from the edgezone 230 to the workzone 220 of the touchpad 110.

The stroke signal, the relative motion digital codes, and the autocursor digital codes are transferred to the mouse code converter. The mouse code converter will create from the stroke signal, the relative motion digital codes, and the autocursor digital codes, a mouse protocol that conform to industry standard computer input mouse protocols. These protocols maybe those that conform to the Microsoft Corporation MS Mouse standard, the International Business Machines, Incorporated PS/2 Mouse standard, and the Apple Computer, Inc. Apple Desktop Bus, and any other applicable mouse protocol.

The touchpad computer interface protocol and the mouse protocol are be transferred to the protocol selector. The touchpad computer interface protocol and the mouse protocol will be buffered and converted to electrical signal levels that conform to the electrical specifications required of the interface between the touchpad-computer interface and the computer system. If a mouse select command is set to a state that is to select the mouse protocols, the mouse protocols are transferred to the computer system to the control the movement of the cursor on a display screen of the computer system. However, if the mouse select command is set to a state that is to select the touchpad computer interface protocol, the touchpad computer interface protocol is transferred to the computer system for further processing.

The output of the protocol selector will be a data transmission media to carry the mouse protocols or the touchpad computer interface protocol to the computer system. The data transmission media may be copper wire, fiber optic cable, infrared optical transmission, or wireless radio frequency transmission. The electrical specifications to communicate between the touchpad computer interface and the computer system often adhere the Electronic Industries Association (EIA) protocol RS-232.

An autopower save circuit will activate a power down signal to the power supply control and regulator circuit to power down the circuits of the touchpad pen-input controller if no pointed object is detected by the pen detect circuit as being in contact with the touchpad surface for a predefined period of time. The autopower save circuit will deactivate the power down signal to the power supply control and regulator circuit and the power supply control and regulator circuit will repower to the touchpad pen-input controller if the pointed object is detected by the pen detect circuit as being in contact with the touchpad surface. The autopower save circuit will also deactivate the power down signal to the power supply control and regulator circuit and the power supply control and regulator circuit will repower the touchpad pen-input controller if the computer system activates the touchpad computer interface. The autopower save circuit will also transmit a copy of the power down signal through a control bus for transmission to the computer system. If the computer system is not actively processing, the computer system will instruct the power supply control and regulator to power down the touchpad pen-input controller and the computer system.

The pen-input has a command interpreter and execution unit connected to the protocol selector to receive and interpret pen-input commands from the computer system. The pen-input commands will set the autocursor mode and boundaries for the edgezone and the deadzone upon the touchpad, the times for the presence detect signal to create the stroke signal, the threshold of movement of the pointed object upon the touchpad necessary to send the mouse protocols to the computer system, the mode of the pen-input mouse controller is to operate, whether the pen-input mouse controller is to send the mouse protocol or the pen-input computer interface protocol to the computer system, the averaging algorithm to used by the absolute coordinate calculator, the minimum pressure required to activate the touchpad, the parameters for the autocursor mode operation, and the time parameters for the autopower save circuit.

The commands in an embodiment of this invention will be extensions to the IBM PS/2 Mouse Command Set. Table 3 shows these commands with the hexadecimal interpretation of the of the binary codes

TABLE 3

| COMMAND | CODE, DATA |
|---|---|
| Set Autocursor Mode | YY, XXh |
| Set Edge Boundary | YY, XXh, XXh$_2$ |
| Set First Minimum Edge Movement Threshold | YY, XXh |
| Set Second Minimum Edge Movement Threshold | YY, XXh |
| Set Autocursor Motion Constraint Speed | YY, XXh |
| Set Autocursor Motion Free Speed | YY, XXh |
| Set Dead Zone Boundary | YY, XXh , XXh$_2$ |
| Set AutoPower Save Time | YY, XXh |
| Set First Finger On Timer | YY, XXh |
| Set Second Finger Off Timer | YY, XXh |
| Set Third Finger On Timer | YY, XXh |
| Set Fourth Finger Off Timer | YY, XXh |
| Set Minimum Mouse Movement Threshold | YYh |
| Set Pen Input Mode | YYh |
| Set Three Dimensional Mode | YYh |
| Set Selected Mouse Protocol Mode | YYh |
| Set Average Algorithm | YY, XXh |
| Set Pressure Threshold | YY, XXh |

The detailed description of the pen-input commands is as follows:

Set Autocursor Mode

This command enables the Autocursor Motion controller into one of the four modes. These modes are dependent on the value of the second byte of this command and are:

| Second Byte (XXh) | Autocursor Mode |
|---|---|
| 00h | Autocursor Mode is never on. |
| 01h | Autocursor Mode is to move the cursor only. |
| 02h | Autocursor Mode is to drag object connected to the cursor only. |
| 03h | Autocursor Mode is always enabled. |

Set Edge Boundary

This command sets the values of the absolute coordinate digital codes that are the threshold of the Autocursor Mode. The pointed object must move over this boundary into the edgezone to enable the Autocursor Motion and have the Autocursor Digital Codes transmitted to the Computer System. The second byte and the third byte of this command contains the value of the absolute coordinate digital code at which the Autocursor Mode is to be enabled.

Set First Minimum Edge Movement Threshold

This command sets the value of the absolute digital codes prior to the threshold of the Autocursor Mode. The second byte of this command contains the the value of the minimum distance of the sample prior to the edge boundary and the sample subsequent to edge boundary to conditionally activate the Autocursor Mode. The codes for the second byte are:

| Second Byte (XXh) | First Threshold Value |
|---|---|
| 00h | one count |
| 01h | two counts |
| 02h | three counts |
| 03h | four counts |

Set Second Minimum Edge Movement Threshold

This command sets the value of the absolute digital codes after the pointed object has crossed the threshold of the Autocursor Mode at which the Autocursor Mode will be unconditionally enabled and the autocursor digital codes will be sent to the computer system. The second byte of this command contains the minimum distance from the first sample subsequent to the edge boundary and a second sample subsequent to the boundary to unconditionally enable the Autocursor Mode. The codes for the second byte are:

| Second Byte (XXh) | Second Threshold Value |
|---|---|
| 00h | one count |
| 01h | two counts |
| 02h | three counts |
| 03h | four counts |

Set Deadzone Boundary

The command establishes the boundary between the edgezone and the deadzone. The second byte and the third byte will contain the value of the absolute coordinates for this boundary.

Set AutoPower Save Time

This command establishes the amount of time that the pointed object must be not in contact for the autopower save circuitry to shut down most of the circuit of the pen-input mouse controller. The pen detect circuit remains active to signal the autopower save circuit is to repower the pen-input mouse controller. The second byte contains the amount of time that the pen must not be in contact with the touchpad.

Set First Finger On Time

Figure 3A:
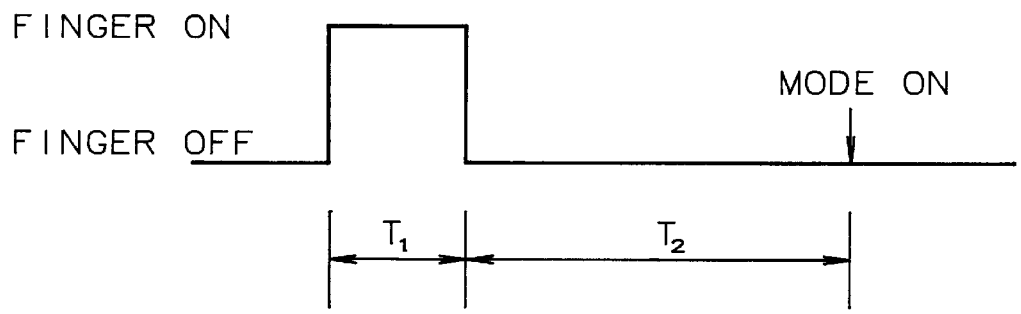
FIGS. 3a–3c are timing diagrams of the timing for the amount of time necessary to establish the single click, double click, and click and drag functions for pen-input from a touchpad to emulate the same functions from the pressing of mouse buttons.
Figure 3B:
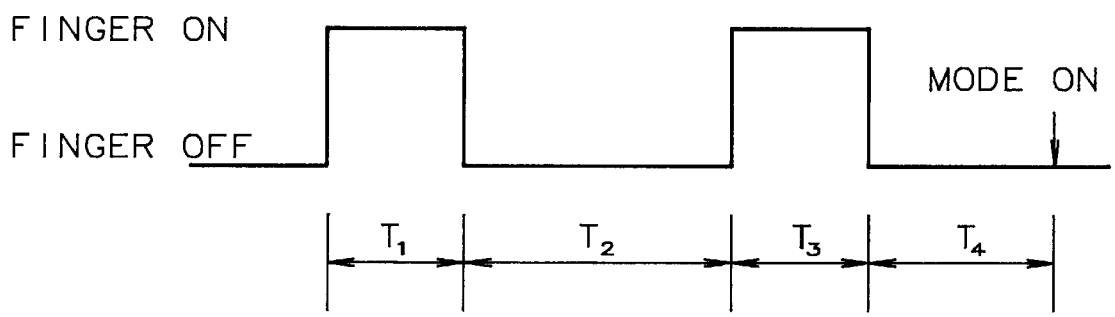
Figure 3C:
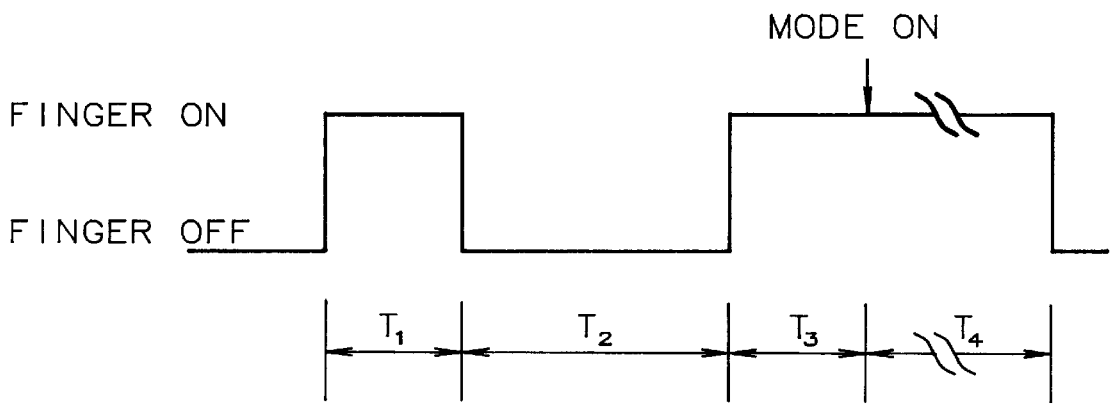

Referring to FIGS. 3a–3c, this command establishes the amount of time $T_1$ that the pointed object must on the touchpad surface to establish the stroke signal that contains the single click, double click, move, press and drag mouse operations. The second byte of the command contains the code that indicates the time $T_1$. The normal time for $T_1$ is approximately 160 milliseconds.

Set Second Finger Off Time

Referring to FIGS. 3a–3c, this command establishes the amount of time $T_2$ that the pointed object must off the touchpad surface to establish the stroke signal that contains the single click, double click, move, press and drag mouse operations. The second byte of the command contains the code that indicates the time $T_2$. The normal time for $T_2$ is approximately 230 milliseconds.

Set Third Finger On Time

Referring to FIGS. 3a–3c, this command establishes the amount of time $T_3$ that the pointed object must on the touchpad surface to establish the stroke signal that contains the double click, press and drag mouse operations. The second byte of the command contains the code that indicates the time $T_3$. The normal time for $T_3$ is approximately 140 milliseconds.

Set Fourth Finger On-Off Time

Referring to FIGS. 3a–3c, this command establishes the amount of time $T_4$ that the pointed object must off the touchpad surface to establish the stroke signal that contains the double click. The second byte of the command contains the code that indicates the time $T_4$. The normal time for $T4_1$ is approximately 30 milliseconds.

Set Minimum Mouse Movement Threshold

This command set the minimum increment in the value of the relative motion digital codes that will be reported to the computer system. The second byte contains the values of the movement threshold. The Default value is one count.

Set Pen Input Mode

This command changes the operation of the pen-input mouse controller to either the pen-input mode to report the absolute relative motion digital codes to the computer system or to the mouse mode to report to the relative motion digital codes to the computer system.

Set Three Dimensional Mode

This command sets the pen-input mouse controller to report either the relative motion digital codes or the absolute coordinate digital codes and the pressure digital codes. The pressure digital codes will contain the vertical information (Z) and may be used to sense the distance the pointed object is from the surface of the touchpad for capacitive touchpads or the pressure the pointed object upon the touchpad for resistive touchpads.

Set Selected Mouse Protocol Mode

This commands instructs the pen-input mouse controller to transmit the relative motion digital codes according to a selected industry standard mouse protocol as described above.

Set Average Algorithm

This command instructs the pen-input mouse controller as to which averaging algorithm to use during the pen-input mode. This algorithm will establish the absolute coordinate digital codes. The second byte identifies which algorithm is to be used for the pen-input mode. The codes for the second byte are:

| Second Byte (XXh) | Averaging Algorithm |
|---|---|
| 00h | No averaging. The absolute coordinate digital codes are established from the coordinate digital codes directly. |
| 01h | Infinite Impulse Averaging Algorithm |
| 02h | Running Average of four samples. |

Set Pressure Threshold

This command sets the minimum pressure of the pointed object upon the touchpad necessary to activate the touchpad and have the pen-input mouse controller report the mouse motion digital codes or the absolute coordinate digital codes. The second byte contains the code for the amount of pressure required to activate the touchpad. The codes for the second byte are:

| Second Byte (XXh) | Pressure Threshold |
|---|---|
| 00h | The touchpad is always activated. |
| 01h | The amount of pressure is low to activate the touch pad. |
| 02h | The amount of pressure is medium to activate the touchpad. |
| 03h | The amount of pressure is high to activate the touchpad. |

While this invention has been particularly shown and described with reference to the preferred embodiments thereof, it will be understood by those skilled in the art that various changes in form and details may be made without departing from the spirit and scope of the invention.

What is claimed is:

1. A touchpad-computer system communication method to permit a computer system to command a touchpad controller to configure the operating parameters of said touchpad controller to emulate the functions of a mouse pointing device to control a cursor upon a display screen of said computer system as a pointed object is moved on a touchpad connected to said touchpad controller, if a mouse mode is selected and to initialize said touchpad controller to provide absolute coordinates of the pointed object as it moved on said touchpad if a pen-input mode is selected, comprising the steps of:

a) transmitting a single configuration command of a plurality of configuration commands from a computer system to a pen-input mouse controller to configure said pen-input mouse controller;

b) interpreting said single configuration command;

c) configuring said pen-input mouse controller as requested by said computer system; and d) transmitting a response code from said pen-input mouse controller to said computer system as required by said single configuration command;

whereby said plurality of configuration commands comprises:

a set autocursor mode command to activate an autocursor mode, deactivate said autocursor mode, to set said autocursor mode to move the cursor only and to set said autocursor mode to move said cursor and an object upon the display screen attached to said cursor;

a set edgezone boundary command to establish a first boundary between a workzone and an edgezone upon said touchpad;

a set first minimum edge movement threshold command to set a value of the absolute digital codes at which the autocursor mode is be conditionally activated, wherein said set first minimum edge movement threshold command contains the value of a minimum distance between a last sampling of the absolute digital codes prior to the pointed object crossing the boundary of the edgezone and a first sampling of the absolute digital codes subsequent to crossing said boundary of the edgezone to conditionally activate the autocursor mode;

a set second minimum edge movement threshold command to set a value of the absolute digital codes at which the autocursor mode is be unconditionally activated, wherein said set second minimum edge movement threshold command contains the value of the minimum distance from said first sampling of the absolute digital codes subsequent to crossing said boundary of the edgezone to a second sampling of the absolute digital codes subsequent to crossing said boundary of the edgezone to unconditionally activate the autocursor mode;

a set constrained speed command to establish a constrained speed component of autocursor digital codes to move said cursor upon said display screen in a constrained motion direction;

a set free speed command to establish a free speed component of said autocursor digital codes to move said cursor upon said display screen in a free motion direction; and a set deadzone boundary command to establish the boundary between the edgezone and the deadzone, wherein said set deadzone boundary command contains the value of the absolute coordinates for this boundary.

2. The method of claim 1 wherein said plurality of configuration commands further comprises:

a set autopower save time command to establish the amount of time that the pointed object must be not in contact for the autopower save circuitry to create the autopower save signal to power down the pen-input mouse controller, wherein said set autopower save time command contains a code that indicates the amount of time that the pen must not be in contact with the touchpad.

3. The method of claim 1 wherein said plurality of configuration commands further comprises:

a) a set first finger on time command to establish the amount of time that the pointed object must on the touchpad surface to establish the stroke signal that contains the single click, double click, move, press, and drag mouse operations;

b) a set second finger off time command to establish the amount of time that the pointed object must off the touchpad surface to establish the stroke signal that contains the single click, double click, move, press, and drag mouse operations;

c) a set third finger on time command to establish the amount of time that the pointed object must on the touchpad surface to establish the stroke signal that contains the double click, press, and drag mouse operations;

d) set fourth finger off time command to establish the amount of time that the pointed object must off the touchpad surface to establish the stroke signal that contains the double click.

4. The method of claim 1 wherein said plurality of configuration commands further comprises:

a) set minimum mouse movement threshold to set the minimum increment in the value of relative motion digital codes that will be reported to the computer system; and b) set pen input mode to change the operation of the pen-input mouse controller to either the pen-input mode, if mouse mode is selected to report the absolute relative motion digital codes to the computer system and to the mouse mode if pen-input is selected to report to the relative motion digital codes to the computer system.

5. The method of claim 1 wherein said plurality of configuration commands further comprises:

a) set three dimensional mode to set the pen-input mouse controller to report either the relative motion digital codes if selected and the absolute coordinate digital codes and the pressure digital codes if selected, wherein the pressure digital codes will contain the vertical information and may be used to sense the distance the pointed object is from the surface of the touchpad for a capacitive touchpad or the pressure the pointed object upon the touchpad for a resistive touchpad; and b) set selected mouse protocol mode command to instruct the pen-input mouse controller to transmit the relative motion digital codes according to a selected industry standard mouse protocol.

6. The method of claim 1 wherein said plurality of configuration commands further comprises:

a) set average algorithm command to instruct the pen-input mouse controller an averaging algorithm of the set of averaging algorithms to use during the pen-input mode, wherein said algorithm will establish the absolute coordinate digital codes; and b) set pressure threshold command set the minimum pressure of the pointed object upon the touchpad necessary to activate the touchpad and have the pen-input mouse controller report the mouse motion digital codes or the absolute coordinate digital codes.

7. A touchpad-computer communication system to transfer digital codes between a computer system and touchpad controller, wherein said digital codes include a plurality of configuration commands that instruct said touchpad controller to assume one of a set of operating modes, a set of mouse motion digital codes, and a set of pen-input digital codes, comprising:

a) Computer system communication adapter coupled to said computer system to transmit said plurality of input commands to the touchpad controller from said computer system, and to receive the mouse motion digital codes and the pen-input digital codes form the touchpad controller to said computer system;

b) A communication medium to convey the digital codes between the touchpad controller and the computer system adapter; and c) The touchpad controller that will detect a presence of a pointed object upon a surface, convert said presence to a set of digital codes that indicate absolute location and force of said pointed object upon said surface, if a pen input mode is selected and to a speed and direction set of digital codes that conform to industry standard computer input mouse protocols, if a mouse mode is selected and transmit such codes through the communication medium, and receive the plurality of pen input commands to configure the operating parameters of said touchpad controller;

whereby said plurality of configuration commands comprise:

a set autocursor mode command to activate an autocursor mode, deactivate said autocursor mode, to set said autocursor mode to move the cursor only and to set said autocursor mode to move said cursor and an object upon the display screen attached to said cursor;

a set edgezone boundary command to establish a first boundary between a workzone and an edgezone upon said touchpad;

a set first minimum edge movement threshold command to set a value of the absolute digital codes at which the autocursor mode is be conditionally activated, wherein said set first minimum edge movement threshold command contains the value of a minimum distance between a last sampling of the absolute digital codes prior to the pointed object crossing the boundary of the edgezone and a first sampling of the absolute digital codes subsequent to crossing said boundary of the edgezone to conditionally activate the autocursor mode;

a set second minimum edge movement threshold command to set a value of the absolute digital codes at which the autocursor mode is be unconditionally activated, wherein said set second minimum edge movement threshold command contains the value of the minimum distance from said first sampling of the absolute digital codes subsequent to crossing said boundary of the edgezone to a second sampling of the absolute digital codes subsequent to crossing said boundary of the edgezone to unconditionally activate the autocursor mode;

a set constrained speed command to establish a constrained speed component of autocursor digital codes to move said cursor upon said display screen in a constrained motion direction;

a set free speed command to establish a free speed component of said autocursor digital codes to move said cursor upon said display screen in a free motion direction; and a set deadzone boundary command to establish the boundary between the edgezone and the deadzone, wherein said set deadzone boundary command contains the value of the absolute coordinates for this boundary.

8. The communication system of claim 7 wherein said plurality of configuration commands further comprises:

a set autopower save time command to establish the amount of time that the pointed object must be not in contact for the autopower save circuitry to create the autopower save signal to power down the pen-input mouse controller, wherein said set autopower save time command contains a code that indicates the amount of time that the pen must not be in contact with the touchpad.

9. The communication system of claim 7 wherein said plurality of configuration commands further comprises:

a) a set first finger on time command to establish the amount of time that the pointed object must on the touchpad surface to establish the stroke signal that contains the single click, double click, move, press, and drag mouse operations;

b) a set second finger off time command to establish the amount of time that the pointed object must off the touchpad surface to establish the stroke signal that contains the single click, double click, move, press, and drag mouse operations;

c) a set third finger on time command to establish the amount of time that the pointed object must on the touchpad surface to establish the stroke signal that contains the double click, press, and drag mouse operations;

d) set fourth finger off time command to establish the amount of time that the pointed object must off the touchpad surface to establish the stroke signal that contains the double click.

10. The communication system of claim 7 wherein said plurality of configuration commands further comprises:

a) set minimum mouse movement threshold to set the minimum increment in the value of the relative motion digital codes that will be reported to the computer system; and b) set pen input mode to change the operation of the pen-input mouse controller to either the pen-input mode, if mouse mode is selected to report the absolute relative motion digital codes to the computer system and to the mouse mode if pen-input is selected to report to the relative motion digital codes to the computer system.

11. The communication system of claim 7 wherein said plurality of configuration commands further comprises:

a) set three dimensional mode to set the pen-input mouse controller to report either the relative motion digital codes if selected and the absolute coordinate digital codes and the pressure digital codes if selected, wherein the pressure digital codes will contain the vertical information and may be used to sense the distance the pointed object is from the surface of the touchpad for a capacitive touch pad or the pressure the pointed object upon the touchpad for a resistive touchpad; and b) set selected mouse protocol mode command to instruct the pen-input mouse controller to transmit the relative motion digital codes according to a selected industry standard mouse protocol.

12. The communication system of claim 7 wherein said plurality of configuration commands further comprises:

a) set average algorithm command to instruct the pen-input mouse controller an averaging algorithm of the set of averaging algorithms to use during the pen-input mode, wherein said algorithm will establish the absolute coordinate digital codes; and b) set pressure threshold command set the minimum pressure of the pointed object upon the touchpad necessary to activate the touchpad and have the pen-input mouse controller report the mouse motion digital codes or the absolute coordinate digital codes.

13. The system of claim 7 wherein the mouse motion digital codes define a direction and a speed for a cursor to move upon a display screen of said computer system.

14. The system of claim 7 wherein the pen-input digital codes define absolute coordinates of a pointed object upon said touchpad connected to said touchpad controller.

* * * * *